United States Patent [19]
Nakashio et al.

[11] 3,954,724
[45] May 4, 1976

[54] PROCESS FOR PREPARING AQUEOUS DISPERSIONS OF HIGH POLYMER USING PULLULAN AS A DISPERSANT

[75] Inventors: Seizo Nakashio, Hyogo; Kozo Tsuji; Nobuhiro Toyota, both of Ibaragi; Fumio Fukita, Osaka; Takeo Oyamada, Ichihara, all of Japan

[73] Assignees: Sumitomo Chemical Company, Limited, Osaka; Hayashibara Biochemical Laboratories, Inc., both of Japan

[22] Filed: Mar. 17, 1975

[21] Appl. No.: 559,379

[30] Foreign Application Priority Data
Mar. 29, 1974 Japan.............................. 49-36432

[52] U.S. Cl.......................... 526/200; 260/17.4 ST; 260/29.6 R
[51] Int. Cl.² ...................... C08F 36/00; C08L 5/00
[58] Field of Search ..... 260/17.4 ST, 80 M, 88.3 A, 260/89.5 A, 89.5 AW, 88.7 R, 88.7 F, 89.5 R, 89.7 R, 92.1, 92.8 W, 93.5 R, 94.2 R, 94.9 A, 93.7; 106/213

[56] References Cited
UNITED STATES PATENTS

| | | | |
|---|---|---|---|
| 3,784,390 | 1/1974 | Hijiya et al. ........................ | 260/17.4 |
| 3,888,809 | 6/1975 | Nakashio et al. ................... | 260/17.4 |

Primary Examiner—Donald E. Czaja
Assistant Examiner—Edward Woodberry
Attorney, Agent, or Firm—Stevens, Davis, Miller & Mosher

[57] ABSTRACT

A process for preparing an aqueous dispersion of high polymer, characterized by using pullulan as a dispersant.

The aqueous high polymer dispersion obtained by the above-mentioned process is not only high in stability but also so excellent in practical properties as to be usable for the processing of fibers or papers.

11 Claims, No Drawings

PROCESS FOR PREPARING AQUEOUS DISPERSIONS OF HIGH POLYMER USING PULLULAN AS A DISPERSANT

This invention relates to a process for preparing an aqueous dispersion of high polymer which is high in stability. More particularly, the invention is concerned with a process for producing an aqueous dispersion of high polymer, characterized by using pullulan as a dispersant.

Generally, aqueous dispersions of high polymers have extensively been used as paints, adhesives, and agents for processing fibers or papers. For preparation of the said aqueous dispersions, there are used as dispersants, in general, polyvinyl alcohols, cellulose ethers such as methyl cellulose and hydroxyethyl cellulose, or ethylene oxide-propylene oxide block copolymers. In case polyvinyl alcohols are used, however, the emulsion polymerization of acrylic acid esters, styrene or vinyl chloride does not progress well, so that no stable aqueous dispersions can be obtained. Moreover, the resulting aqueous dispersions are low in compatibility with salts and pigments. The same drawbacks as above are seen also in the case where methyl cellulose or ethylene oxide-propylene oxide copolymers are used. When hydroxyethyl cellulose is used, the emulsion polymerization proceeds relatively well, but the resulting aqueous dispersions are undesirably low in compatibility with other additives.

With an aim to develop aqueous dispersions of high polymers which are free from the above-mentioned drawbacks and are excellent for the processing of fibers and papers, the present inventors conducted extensive studies to accomplish the present invention.

An object of the present invention is to provide a novel aqueous dispersion of high polymer characterized by using pullulan as a dispersant.

Another object of the invention is to provide an aqueous dispersion of high polymer which is high in stability and is excellent in practical properties.

Other objects and advantages of the invention will become apparent from the following description.

The present invention is a process for preparing an aqueous dispersion of high polymer which comprises subjecting a polymerizable monomer to emulsion polymerization in water in the presence of a catalyst, characterized by using pullulan as a dispersant. According to the process of the present invention, the emulsion polymerization can be successfully carried out and the resulting aqueous dispersion of high polymer is high in stability and is so excellent in practical properties as to be usable for processing of fibers or papers, for example.

The pullulan used in the present invention is such a linear high polymer that units of maltotriose, which is a trimer of glucose, have been repeatedly bonded through $\alpha$-1,6 linkages which are different from the linkages of said trimer, and has the molecular structure represented by the formula,

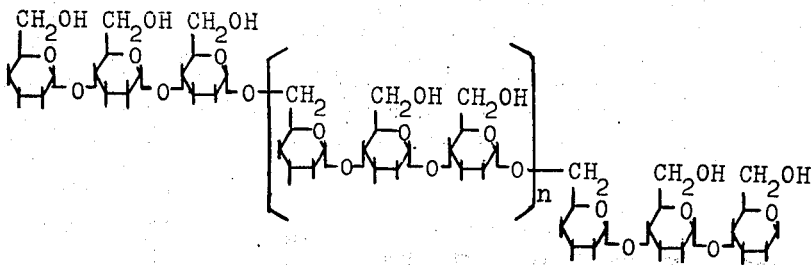

wherein $n$ is an integer of 20 to 10,000 which shows the polymerization degree.

Until recently, pullulan has been known merely as a water-soluble tacky substance, and is a novel substance unknown in the field of dispersants.

While the pullulan used in the present invention contains glucose units in its molecule, it is entirely different in molecular structure from starches, cellulose, amylose, carboxymethyl cellulose, alkyl celluloses, hydroxyalkyl celluloses and the like polysaccharides or derivatives thereof which also are glucose derivatives composed mainly of glucose units, like in the case of pullulan. This is connected with the excellent properties of pullulan. Pullulan is markedly excellent in film-forming ability, and forms a film which is excellent in strength, elasticity, hardness, gloss, transparency, adhesion, heat resistance, weather resistance and gas impermeability. Further, pullulan is excellent also in adhesiveness and tackiness. These characteristic properties of pullulan imparts excellent properties to an aqueous high polymer dispersion prepared by using pullulan as a dispersant. Still further, pullulan is quite easily soluble in water and is high in processability, and its aqueous solution does not cause gelation nor so-called "aging" phenomenon.

The process of the present invention may be carried out according to the known emulsion polymerization process, except that pullulan is used as a dispersant. The amount of pullulan to be used is 0.1 to 10 parts, preferably 0.5 to 5 parts, by weight per 100 parts by weight of the polymerizable monomer employed, but may be properly decided according to the uses of the resulting aqueous dispersion. Further, pullulan may be used in combination with a known emulsifier or protective colloid, but the amount of the emulsifier or protective colloid should be within such a range as not to decrease the effects of pullulan.

Examples of the polymerizable monomer used in the present invention are ethylenic compounds represented by the general formula,

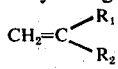

wherein
$R_1$ is H, a $C_1$–$C_4$ hydrocarbon group or a halogen; and
$R_2$ is H, a $C_1$–$C_4$ hydrocarbon group, a halogen, -OCOR$_3$, where $R_3$ is a $C_1$–$C_{18}$ hydrocarbon group,

where $R_4$ is H, an alkali metal, an alkaline earth metal, a $C_1$–$C_{12}$ hydrocarbon group, or its halogen-, hydroxyl group-, alkoxy group- or epoxy group-substituted derivative, -CN, -CONR$_5$R$_6$, where $R_5$ and $R_6$ are individually H, a $C_1$–$C_{12}$ hydrocarbon group, or its halogen-, hydroxyl group-, alkoxy group- or epoxy group-substituted derivative, -CH=CH$_2$,

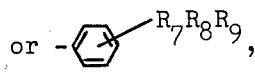

where $R_7$, $R_8$ and $R_9$ are individually H, a $C_1$–$C_4$ hydrocarbon group, a halogen, a hydroxyl group or an alkoxy group;

compounds represented by the general formula,

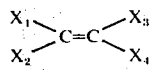

wherein
$X_1$, $X_2$, $X_3$ and $X_4$ are individually H, a halogen or

where $R_{10}$ is a $C_1$–$C_4$ hydrocarbon group, an alkali metal or an alkaline earth metal, provided that $X_2$ and $X_4$ should always be substituents other than H, and maleic anhydride and anhydrous maleimide. Considering the characteristics of the present invention, the polymerizable monomer to be used is preferably low in water solubility.

Concrete examples of the above-mentioned compounds are ethylene, propylene, butylene, vinyl acetate, vinyl propionate, vinyl butyrate, vinyl versatate (Veova -9), N-methylolacrylamide, methyl acrylate, ethyl acrylate, propyl acrylate, butyl acrylate, methacrylic acid, methyl methacrylate, ethyl methacrylate, propyl methacrylate, butyl methacrylate, 2-ethylhexyl methacrylate, decyl methacrylate, lauryl methacrylate, stearyl methacrylate, glycidyl methacrylate, acrylonitrile, methacrylonitrile, butadiene, styrene, α-methylstyrene, α-chlorostyrene, 2,4-dichlorostyrene, p-nitrostyrene, p-methoxystyrene, p-methylstyrene, m-methylstyrene, p-phenylstyrene, p-acetoxystyrene, p-aminostyrene, m-cyanostyrene, vinyl chloride, vinylidene chloride, vinylidene fluoride, tetrafluoroethylene, maleic anhydride and anhydrous maleimide. These monomers may be used either singly or in the form of a mixture of two or more members, the mixing proportions of which may suitably be selected according to the application purpose of the resulting dispersion and are not particularly limited. The amount of the polymerizable monomer used at the time of emulsion polymerization is not particularly limited, but is ordinarily 25 to 400 parts, preferably 60 to 200 parts, by weight per 100 parts by weight of water employed.

The catalyst to be used in the polymerization according to the process of the present invention may be any catalyst so far as it is usable in emulsion polymerization, in general. Such catalyst includes various free radical-forming catalysts, e.g. peroxides and cerium ions. Particularly suitable as the catalyst is a so-called redox catalyst which is composed of the combination of a reducing agent with an oxidizing agent. Preferably examples of the oxidizing agent, i.e. initiator, are hydrogen peroxide, organic peroxides such as benzoyl peroxide, lauroyl peroxide and t-butyl hydroperoxide, ammonium persulfate, potassium persulfate, sodium persulfate, ammonium perborate, potassium perborate and sodium perborate. Preferable examples of the reducing agent, i.e. activator, are ammonium, potassium and sodium salts of bisulfurous acid, sulfoxylate, ferrous chloride, saccharidies such as vitamin C, Rongalit, oxalic acid and the like compounds having reducing ability.

The amount of the initiator to be used is not particularly limited, but is preferably 0.1 to 2 parts by weight per 100 parts by weight of the polymerizable monomer, and the amount of the activator to be used is preferably 25 to 100 parts by weight per 100 parts by weight of the initiator. These agents may be added at one time from the beginning in required amounts, or may be added divisionally during the reaction.

The reaction conditions to be adopted are not particularly limited, but the reaction temperature is in the range of 0° to 100°C., preferably 30° to 80°C., and the reaction pressure is ordinarily in the range of 1 to 1000 kg/cm².

The pullulan used in the present invention is not particularly limited in process for production thereof, and may be obtained by biochemical synthetic process. At present, it can be isolated and recovered as a tacky substance secreted in a culture liquor of a strain belonging to the genus Pullularia which is an incomplete microorganism. That is, a strain of the species Pullularia pullulans is subjected to shaking culture at 24°C. for 5 days in a medium containing 10% of partially hydrolyzed starch, 0.5% of K$_2$HPO$_4$, 0.1% of NaCl, 0.02% of MgSO$_4$.7H$_2$O, 0.06% of (NH$_4$)$_2$SO$_4$ and 0.04% of yeast extract, whereby pullulan is obtained as a tacky substance secreted from the cells into the culture liquor. If necessary, the cells are removed by centrifugation from the culture liquor, and the supernatant is subjected to methanol precipitation and separation, whereby purified pullulan can be obtained.

Pullulan somewhat varies in physical properties depending on the kind of strain used. This, however, is not greatly concerned with the properties of dispersant, and pullulan obtained from any strain may be used as the dispersant in the present invention.

The molecular weight of the pullulan used in the present invention is not particularly limited, but is 5,000 to 5,000,000, preferably 50,000 to 1,000,000.

The present invention is illustrated in further detail below with reference to examples, but the invention is not limited to the examples.

EXAMPLE 1

Aqueous ethylene-vinyl acetate copolymer dispersion:

In 100 parts (by weight; the same shall apply hereinafter) of water were dissolved 3.5 parts of pullulan (molecular weight 1,000,000) and 1.0 part of pullulan (molecular weight 150,000) as dispersants. The resulting solution was fed to a nitrogen-flushed reactor of 5 liters in inner volume, and then heated to a temperature of 55°C., while dispersing 100 parts of vinyl acetate into the solution, and ethylene was introduced under pressure into the reactor to a pressure of 45 kg/cm$^2$. After stirring the resulting dispersion under an ethylene pressure of 55 kg/cm$^2$ for 30 minutes until the dissolution of ethylene into vinyl acetate became near to saturation, 20 parts of a 4% aqueous potassium persulfate solution and 15 parts of a 5% aqueous Rongalit solution were continuously added to the system to initiate polymerization. The polymerization was carried out over a period of about 5 hours while maintaining the ethylene pressure at 45 kg/cm$^2$. After confirming the fact that the amount of residual monomer had become less than 0.5 wt%, the system was cooled to 20°C. to complete the polymerization. The resulting aqueous ethylene-vinyl acetate copolymer dispersion had a solid content of 54.5 wt% and a viscosity (BL type viscometer-60 r.p.m., 25°C.) of 465 cps. The copolymer was composed of 20 wt% of ethylene and 80 wt% of vinyl acetate (as measured by hydrolysis and material balance).

EXAMPLE 2

Aqueous ethylene-vinyl chloridie-vinyl acetate terpolymer dispersion:

The same polymerization as in Example 1 was effected, except that 100 parts of vinyl acetate was replaced by a mixture comprising 55 parts of vinyl chloride and 45 parts of vinyl acetate and ethylene pressure was 60 kg/cm$^2$. The resulting aqueous ethylene-vinyl chloride-vinyl acetate terpolymer dispersion had a solid content of 55.1 wt% and a viscosity of 660 cps. The terpolymer was composed of 24 wt% of ethylene, 45 wt% of vinyl chloride and 35 wt% of vinyl acetate (as measured by hydrolysis, chlorine analysis and material balance).

EXAMPLE 3

Aqueous ethylene-vinyl acetate copolymer dispersion:

In 100 parts of water were dissolved 2.0 parts of pullulan (molecular weight 150,000), 2.0 parts of Pluronic L-64 (ethylene oxide-propylene oxide block copolymer) and 0.5 part of Emal-10 (sodium alkylsulfonate) as dispersants. The resulting solution was fed to a nitrogen-flushed reactor of 5 liters in inner volume, and then heated to a temperature of 50°C., while dispersing 100 parts of vinyl acetate into the solution, and ethylene was introduced under pressure into the reactor to a pressure of 40 kg/cm$^2$. After stirring the resulting dispersion under an ethylene pressure of 40 kg/cm$^2$ for 30 minutes until the dissolution of ethylene into vinyl acetate became near to saturation, 20 parts of a 4% aqueous potassium persulfate solution and 15 parts of a 5% aqueous Rongalit solution were continuously added to the system to initiate polymerization. The polymerization was carried out over a period of about 6 hours while maintaining the ethylene pressure at 40 kg/cm$^2$. After confirming the fact that the amount of residual monomer had become less than 0.5 wt%, the system was cooled to 20°C. to complete the polymerization. The resulting aqueous ethylene-vinyl acetate copolymer dispersion had a solid content of 55.6 wt% and a viscosity of 1,600 cps. The copolymer was composed of 15.5 wt% of ethylene and 84.5 wt% of vinyl acetate (as measured by hydrolysis and material balance).

EXAMPLE 4

Aqueous ethylene-vinyl acetate-vinyl propionate terpolymer dispersion:

The same polymerization as in Example 3 was effected, except that 100 parts of vinyl acetate was replaced by a mixture comprising 70 parts of vinyl acetate and 30 parts of vinyl propionate. The resulting aqueous ethylene-vinyl acetate-vinyl propionate terpolymer dispersion had a solid content of 55.1 wt% and a viscosity of 1,200 cps. The erpolymer was composed of 16 wt% of ethylene and the balance of a mixture of vinyl acetate and vinyl propionate (as measured by material balance).

EXAMPLE 5

Aqueous ethylene-vinyl acetate-vinyl propionate-vinyl versatate quadripolymer dispersion:

The same polymerization as in Example 3 was effected, except that 100 parts of vinyl acetate was replaced by a mixture comprising 65 parts of vinyl acetate, 15 parts of vinyl propionate and 20 parts of vinyl versatate (Veova -9 of Shell Chemical Co.). The resulting aqueous ethylene-vinyl acetate-vinyl propionate-vinyl versatate quadripolymer dispersion had a solid content of 54.9 wt% and a viscosity of 1,080 cps. The quadripolymer was composed of 15 wt% of ethylene, 16 wt% of vinyl versatate, and the balance of a mixture of vinyl acetate and vinyl propionate (as measured by hydrolysis and material balance).

EXAMPLE 6

Aqueous ethylene-vinyl acetate-N-methylol acrylamide terpolymer dispersion:

In 120 parts of water were dissolved the same dispersants as in Example 3. The resulting solution was fed to a nitrogen-flushed reactor of 5 liters in inner volume, and then heated to a temperature of 50°C., while dispersing 100 parts of vinyl acetate, and ethylene was introduced under pressure into the reactor to a pressure of 60 kg/cm$^2$. After stirring the resulting dispersion under an ethylene pressure of 60 kg/cm$^2$ for 30 minutes until the dissolution of ethylene into vinyl acetate became near to saturation, 20 parts of a 4% aqueous ammonium persulfate solution and 15 parts of a 5% aqueous Rongalit solution were continuously added to the system to initiate polymerization. During the polymerization, 20 parts of a 40% aqueous N-methylol acrylamide solution was continuously added. The polymerization was carried out over a period of about 5.5 hours. After confirming the fact that the amount of residual monomer had become less than 0.5 wt%, the system was cooled to 20°C. to complete the polymerization. The resulting aqueous ethylenevinyl acetatel-N-methylol acrylamide terpolymer dispersion had a solid content of 49 wt% and a viscosity of 920 cps. The terpolymer was composed of 25 wt% of ethylene and the balance of a mixture of vinyl acetate and N-methylol acrylamide (as measured by material balance).

EXAMPLE 7

Aqueous ethylene-vinyl acetate-vinyl chloride-N-methylol acrylamide quadripolymer dispersion:

The same polymerization as in Example 6 was effected, except that 100 parts of vinyl acetate was replaced by a mixture comprising 70 parts of vinyl chloride and 30 parts of vinyl acetate and the ethylene pressure was varied to 40 kg/cm². The resulting aqueous ethylene-vinyl chloride-vinyl acetate-N-methylol acrylamide quadripolymer dispersion had a solid content of 49.3 wt% and a viscosity of 980 cps. The quadripolymer was composed of 60 wt% of vinyl chloride, 14 wt% of ethylene, and the balance of a mixture of vinyl acetate and N-methylol acrylamide (as measured by hydrolysis, chlorine analysis and material balance).

EXAMPLE 8

Aqueous polyvinyl acetate dispersion:

In 100 parts of water were dissolved 3.0 parts of pullulan (molecular weight 150,000) and 1.0 part of pullulan (molecular weight 70,000) as dispersants. The resulting solution was fed to a nitrogen-flushed reactor of 5 liters in inner volume, and then heated to a temperature of 50°C., while dispersing 125 parts of vinyl acetate into the solution. Subsequently, 20 parts of a 4% aqueous potassium persulfate solution and 15 parts of a 5% aqueous Rongalit solution were continuously added to the system to initate polymerization. The polymerization was carried out over a period of about 4 hours. After confirming the fact that the amount of residual monomer had become less than 0.5 wt%, the system was cooled to 20°C. to complete the polymerization. The resulting aqueous polyvinyl acetate dispersion had a solid content of 49.8 wt% and a viscosity of 130 cps.

The aqueous polymer dispersions obtained in Examples 1 to 8 were measured in amount of coarse particles[1], storage stability[2] and mechanical stability[3]. The results obtained were as set forth in Table 1.

Table 1

| | Amount of[1] coarse particles (p.p.m.) | Storage stability[2] (Formation of precipitates after storage for 6 months) | Mechanical stability[3] (Formation of coagulation after stirring) |
|---|---|---|---|
| Example 1 | 86 | None | None |
| Example 2 | 120 | " | " |
| Example 3 | 80 | " | " |
| Example 4 | 110 | " | " |
| Example 5 | 90 | " | " |
| Example 6 | 40 | " | " |
| Example 7 | 60 | " | " |
| Example 8 | 70 | " | " |

Notes:
[1]Each dispersion was filtered through a 120 mesh-metal wire, and the amount (p.p.m.) of non-filterable coarse particles was measured.
[2]Each dispersion was allowed to stand at room temperature for 6 months, and then the formation of precipitates was observed.
[3]Each dispersion was stirred at 25°C. for 30 minutes by means of a homogenizer (speed, 15,000 r.p.m.) and then the formation of coagulation was observed.

As is clear from Table 1, all the aqueous polymer dispersions were less in amount of coarse particles formed and were excellent in storage stability and mechanical stability.

EXAMPLE 9

The aqueous ethylen-vinyl acetate-N-methylol acrylamide terpolymer dispersion synthesized in Example 6 was tested in efficiency as a binder for processing papers and fibers by impregnating a filter paper and a rayon web with said dispersion and evaluating the properties of the impregnated filter paper and rayon web.

For comparison, an aqueous dispersion, which had been synthesized in the same manner as in Example 6, except that the pullulan used as the dispersant was replaced by hydroxyethyl cellulose (HEC), was also tested in the same manner as above.

The results obtained were as set forth in Table 2.

Table 2

| Dispersant | Impregnated paper | | Impregnated rayon web | | | Processability | |
| | Sizing* degree | Folding strength | Trichlene resistance | Thermal coloration | Hand touch | Coagulation | Impregnating property |
|---|---|---|---|---|---|---|---|
| Pullulan (Example 6) | ⊚ | ⊚ | o | o | o (Soft) | o | o |
| HEC (Control) | o | o | o | o | o (Soft) | o | o |

⊚: Excellent
*: Sizing degree was measured by Stockigt method.
o: Favorable

As is clear from Table 2, the filter paper and rayon web treated with the aqueous dispersion using pullulan as the dispersant is superior in sizing degree and trichlene resistance to those treated with the control aqueous dispersion using HEC as the dispersant. Thus, it is obvious that pullulan is a preferable dispersant usable in the fields of papers and nonwoven fabrics.

What is claimed is:

1. A process for preparing an aqueous dispersion of high polymer which comprises
subjecting a polymerizable monomer to emulsion polymerization in water in the presence of a catalyst, characterized by using pullulan in a proportion of 0.5 to 5 parts by weight per 100 parts by weight of a polymerizable monomer, the polymerizable monomer being at least one member selected from the group consisting of compounds represented by the general formula,

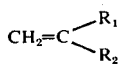

wherein
$R_1$ is H, a $C_1$–$C_4$ hydrocarbon group or a halogen; and
$R_2$ is H, a $C_1$–$C_4$ hydrocarbon group, a halogen, -OCOR$_3$, where $R_3$ is a $C_1$–$C_{18}$ hydrocarbon group,

where $R_4$ is H, an alkali metal, an alkaline earth metal, a $C_1$–$C_{12}$ hydrocarbon group, or its halogen-, hydroxyl group-, alkoxy group- or epoxy group-substituted derivative,
—CN, —CONR$_4$R$_6$, where $R_5$ and $R_6$ are individually H, a $C_1$–$C_{12}$ hydrocarbon group, or its halogen-, hyroxyl group-, alkoxy group- or epoxy group-substituted derivative,

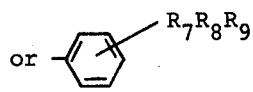

where $R_7$, $R_8$ and $R_9$ are individually H, a $C_1$–$C_4$ hydrocarbon group, a halogen, a hydroxyl group or an alkoxy group; compounds represented by the general formula,

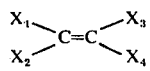

wherein
$X_1$, $X_2$, $X_3$ and $X_4$ are individually H, a halogen or

where $R_{10}$ is a $C_1$–$C_4$ hydrocarbon group, an alkali metal or an alkaline earth metal, provided that $X_2$ and $X_4$ should always be substituents other than H; and maleic anhydride and anhydrous maleimide.

2. A process according to claim 1, wherein the molecular weight of the pullulan used is 5,000 to 5,000,000.

3. A process according to claim 1, wherein the polymerizable monomer is used in a proportion of 25 to 400 parts by weight per 100 parts by weight of the water.

4. A process according to claim 1, wherein the polymerizable monomer is at least one member selected from the group consisting of ethylene, propylene, butylene, vinyl acetate, vinyl propionate, vinyl butyrate, vinyl versatate, N-methylol acrylamide, methyl acrylate, ethyl acrylate, propyl acrylate, butyl acrylate, methacrylic acid, methyl methacrylate, ethyl methacrylate, propyl methacrylate, butyl methacrylate, 2-ethylhexyl methacrylate, decyl methacrylate, lauryl methacrylate, stearyl methacrylate, glycidyl methacrylate, acrylonitrile, butadiene, styrene, α-methylstyrene, p-chlorostyrene, 2,4-dichlorostyrene, p-nitrostyrene, p-methoxystyrene, p-methylstyrene, m-methylstyrene, p-phenylstyrene, p-acetoxystyrene, p-aminostyrene, m-cyanostyrene, vinyl chloride, vinylidene chloride, vinylidene fluoride, tetrafluoroethylene, maleic anhydride and anhydrous maleimide.

5. A process according to claim 1, wherein the catalyst is composed of an oxidizing agent and a reducing agent.

6. A process according to claim 5, wherein the oxidizing agent is hydrogen peroxide, benzoyl peroxide, lauroyl peroxide, t-butyl hydroperoxide, ammonium persulfate, potassium persulfate, sodium persulfate, ammonium perborate, potassium perborate or sodium perborate.

7. A process according to claim 5, wherein the reducing agent is ammonium bisulfite, potassium bisulfite, sodium bisulfite, sulfoxylate, ferrous chloride, vitamin C, Rongalit or oxalic acid.

8. A process according to claim 5, wherein the oxidizing agent is used in a proportion of 0.1 to 2 parts by weight per 100 parts by weight of the polymerizable monomer.

9. A process according to claim 5, wherein the reducing agent is used in a proportion of 25 to 100 parts by weight per 100 parts by weight of the oxidizing agent.

10. A process according to claim 1, wherein the polymerization is effected at a temperature of 0° to 100°C.

11. A process according to claim 1, wherein the polymerization is effected under a pressure of 1 to 1,000 kg/cm².

* * * * *